United States Patent [19]

Inasawa et al.

[11] 4,191,422

[45] Mar. 4, 1980

[54] ADJUSTABLE HEADREST

[75] Inventors: Hideho Inasawa; Yoshinori Akiyama, both of Yokohama, Japan

[73] Assignee: Nissan Motor Company, Limited, Japan

[21] Appl. No.: 930,247

[22] Filed: Aug. 2, 1978

[30] Foreign Application Priority Data

Nov. 30, 1977 [JP] Japan .................................. 52/160513

[51] Int. Cl.² .............................................. A47C 1/10
[52] U.S. Cl. .................................... 297/391; 297/407; 297/409
[58] Field of Search ............... 297/391, 406, 407, 409, 297/410

[56] References Cited

U.S. PATENT DOCUMENTS

| 830,149 | 9/1906 | Head et al. | 297/407 |
|---|---|---|---|
| 1,371,201 | 3/1921 | Driver | 297/407 |
| 1,746,091 | 2/1930 | Skidmore | 297/409 X |
| 1,957,608 | 5/1934 | McCann | 297/409 |
| 2,087,152 | 7/1937 | Johnson | 297/409 |
| 3,342,528 | 9/1967 | Radke et al. | 297/407 X |

*Primary Examiner*—James C. Mitchell
*Attorney, Agent, or Firm*—Lane, Aitken & Ziems

[57] ABSTRACT

An adjustable headrest for a vehicle seat comprises a stationary guide rail, a slide rail slidable along the guide rail forwardly and backwardly of the seat among several adjusting positions, and means locking the slide rail in one of the adjusting positions, so that the headrest is adjustable back and forth to comfortably adapt to the desired postures of a seat occupant.

5 Claims, 6 Drawing Figures

ADJUSTABLE HEADREST

This invention relates generally to a vehicle seat arrangement and particularly to an adjustable headrest mounted on the top of the seat backrest.

Several types of headrests, known in the past as adjustable, are those shiftable up and down or tiltable back and forth with respect to the seat backrest.

SUMMARY OF THE INVENTION

It is an object of the invention to provide a new and improved adjustable headrest for a vehicle seat which is adjustable in a horizontal plane forwardly and backwardly of the seat.

Another object of the invention is to provide an adjusting mechanism for a headrest of the type mentioned above which comprises a slide rail slidable relative to a fixed guide rail, and means operating the slide rail between a plurality of adjusting positions, while locking the sliderail in one of the adjusting positions.

Still another object of the invention is to provide an adjusting mechanism for a vehicle seat headrest for combined adjustment in a vertical direction and in a horizontally back-and-fourth direction.

A further object of the invention is to provide an adjustable headrest of the type described above which is simple in structure as well as in operation.

These and other objects, features and advantages of this invention will be apparent by the following detailed explanation of the preferred embodiments of the invention with reference to the accompanying drawings.

BRIEF DESCRIPTION OF THE DRAWINGS

Like numerals are used for the like and corresponding parts in both of the embodiments.

DETAILED DESCRIPTION OF EMBODIMENTS

Reference should be first made to FIGS. 1 to 4 illustrating the first preferred embodiment. A headrest assembly essentially consists of an adjustably movable part generally indicated by a symbol A and a stationary part B via which the movable part A is connected to the top of a non-illustrated backrest of a vehicle seat. The stationary part B includes a stay 1 as of a single metal wire, two and leg sections (no numeral) which are to be put into and fastened to the seat backrest. The two leg portions both have several holes 1a into which connecting pins or projections (not shown) formed on the seat backrest are engageable. Thus, the stay 1 is adjustable among several vertical positions upon mounting the headrest on the seat backrest. A section of the stay bridging the two legs is bent generally at right angle to the legs.

Figure 1:
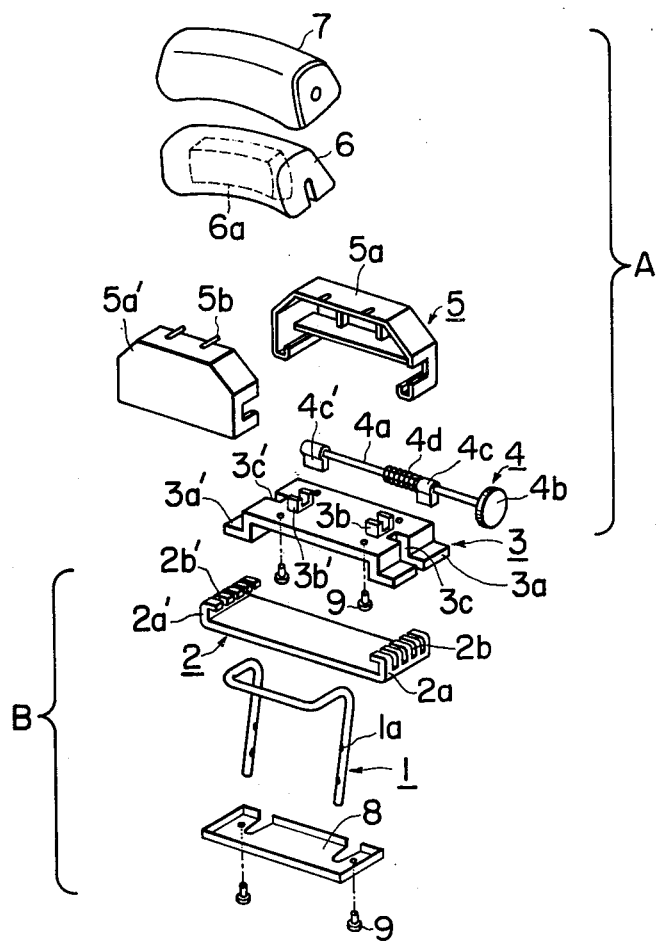
FIG. 1 is an exploded view of a first preferred embodiment of the invention.

A generally rectangular, lower guide rail 2, preferably of metal plate, is at its bottom surface welded to the bridge section of the stay in an appropriate way such as welding. Each end of the guide rail 2 is upwardly and then inwardly bent at 2a, 2a' so that the guide rail presents a generally C-profile with an upwardly directed opening, as seen in FIG. 1. Each of the bent end portions 2a, 2a' is formed with a plurality of notches 2b, 2b' equi-distantly arranged throughout the width of the end section.

A likewise rectangular, upper slide rail 3, of a metal or synthetic resin plate, has respectively at its each end downwardly and outwardly bent sections 3a, 3a' which are slidably engageable in the corresponding end portions 2a, 2a' of the lower guide rail. The width of the upper rail 2 is somewhat greater than that of the lower rail. Each of the bent end portions 3a, 3a' of the upper rail is formed with a notch 3c, 3c' substantially at the center of the lateral width of the upper rail. This notch is inwardly more deeply recessed than the notches 2b, 2b' at the lower rail, for the purpose as will be apparent later.

Indicated by numeral 4a is a manually operable shaft axially reciprocally supported on the upper rail 3 over the length of the latter. More specifically, at least two bearing members 3b, 3b' are mounted on the top surface of the upper rail 3 on a line connecting the two notches 3c, 3c' somewhat inward of the same; the shaft 4a is loosely received in these bearing members 3b, 3b'.

One end of the shaft 4a is provided with a knob 4b for access to a user or operator of the adjustable headrest. The shaft has also formed integrally or fixedly with two spaced lock members 4c, 4c' which are adapted to engage in the respective notches 3c and 3c' when the shaft 4a is laid on the upper rail.

A spiral spring 4d is wound around the shaft between the bearing 3b and the lock member 4c. Thus, the lock member 4c together with the shaft itself is normally biased rightwardly in the drawing to engage in the notch 3c and one of the notches 2b when the latter aligns with the notch 3c.

Figure 2:
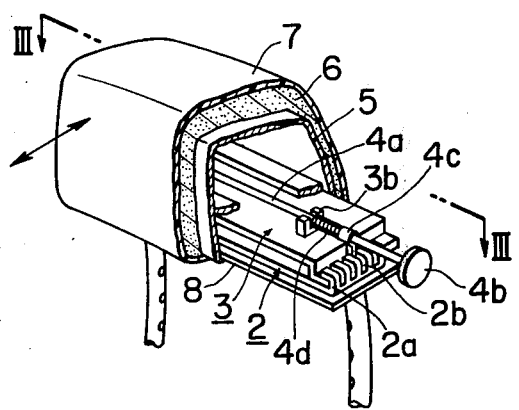
FIG. 2 is a perspective, partially broken-away view of the embodiment shown in FIG. 1 in an assembled state.
Figure 3:
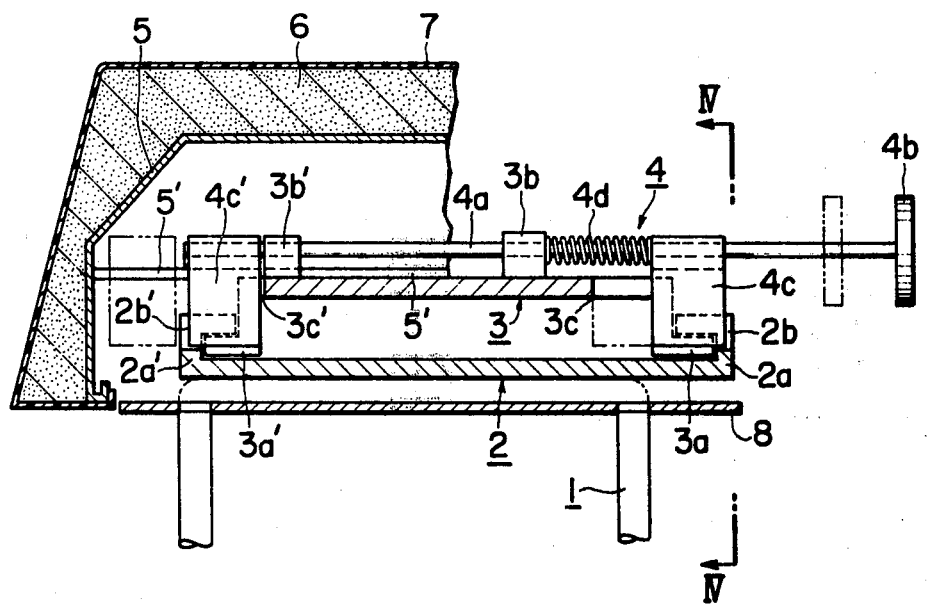
FIG. 3 is a view in section taken along the line III—III of FIG. 2.
Figure 4:
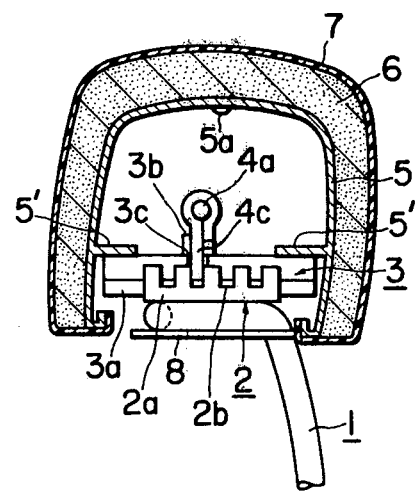
FIG. 4 is a view in section taken along the line IV—IV of FIG. 3.

The aforementioned elements assembled together are enclosed in a cover 5 consisting of two mating halves 5a, 5a', for instance, of synthetic resin, which are snapped into each other by means of fasteners 5b. To facilitate slide movement of the upper rail, support shelves (no numeral) are attached to the inner wall of the cover 5 as shown in FIGS. 1 and 2.

The cover 5 is fitted in a correspondingly shaped recess 6a of a cushioning pad 6 which itself is then covered with an upholstering material 7. The bottom of the assembly is covered with an underpanel 8 which is fastened to the guide rail 2 as by screws 9 with notches (no numeral) for passing the leg sections of the stay 1 therethrough.

The headrest assembly as described in the foregoing operates as follows. As indicated by a solid line in FIG. 3, the lock members 4c are normally in engagement with the notch 3c of the upper rail and one of the notches 2b of the guide rail aligned with the notch 3c by the action of the spring 4d.

To effect the back and forth movement of the headrest assembly, one pushes the knob 4b at the shaft leftwardly in the drawing to a position indicated by a phantom line against the load of the spring 4d. The lock member 4c is then disengaged from the notch 2b and therefore from an outer part of the notch 3c aligned with the notch 2b and falls into the deeply recessed part of the notch 3c. The lock member 4c' is also disengaged from the notches 3c' and 2b' and outwardly of both rails as shown. Thus, the upper rail, together with the lock members 4c, 4c', is freely movable forwardly and backwardly along the guide rail 2. The user of the headrest assembly is thus able to adjust the headrest to a desired position with the push force kept exerted on the knob.

As soon as the push force is removed from the shaft 4a, the shaft 4a with the locking members are sprung into both notches 3c, 3c' and 2b, 2b' now aligned, thus locking the assembly in the position already selected. The lock member 4c' abuts the bearing 3b' to limit the springy movement of the shaft 4a during this release action.

Figure 5:
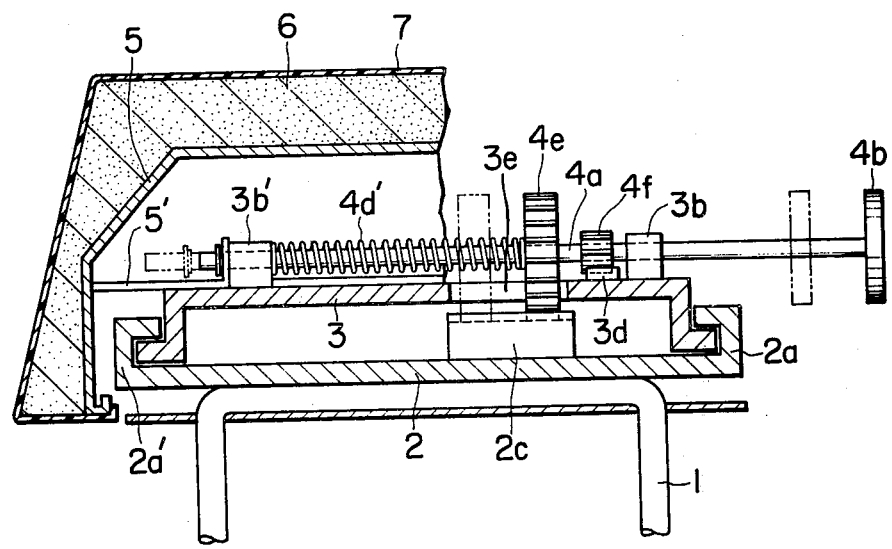
FIG. 5 is a view similar to FIG. 3 but illustrating a second preferred embodiment of the invention.
Figure 6:
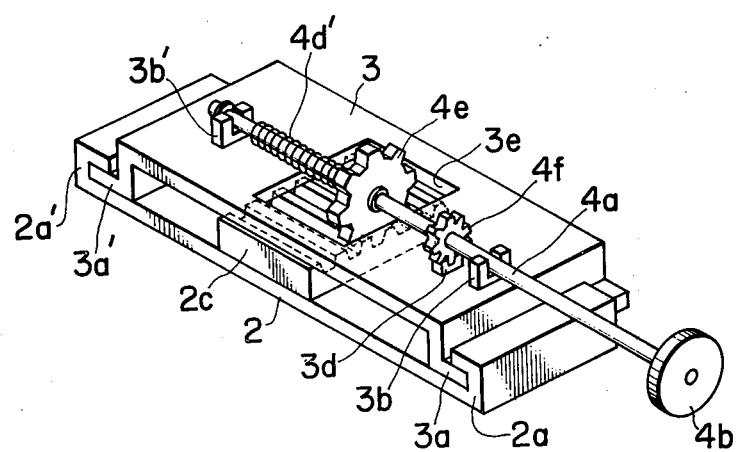
FIG. 6 is a perspective view showing an important part of the embodiment shown in FIG. 5.

Another preferred embodiment is now described with reference to FIGS. 5 and 6. According to this embodiment, there are formed no notches on the slide and guide rails. Instead, a relatively wide rack 2c is fixedly laid on the guide rail, the rack having teeth running in the longitudinal direction of the guide rail. The upper rail 3 is provided with a rectangular opening 3e substantially above the rack 2c for the purpose mentioned later.

The shaft 4a is borne by the bearings 3b, 3b' not only reciprocally but also rotatably in this embodiment and carries a pinion or toothed wheel 4e meshing with the rack 2c on the guide rail through the opening 3e of the upper rail. A spiral spring 4d'' is wound around the shaft 4a between the left bearing 3b' and the pinion 4e in the illustrated embodiment to normally bais the shaft 4a rightwardly in the drawing. The width of the rack 2c is so determined to be greater than the maximum stroke of reciprocal movement of the shaft 4a so that the pinion 4e is not disengaged from the rack at the leftmost position of the shaft. Also the rectangular opening 3e is sized to assure enough space for rotary motion of the pinion 4e.

The lock mechanism in this embodiment consists of a lock pinion 4f mounted on the shaft and a latch or pawl type member 3d fixed on the top surface of the upper rail 3, which is engageable with the lock pinion 4f to lock the rotary motion of shaft and therefore of the pinion 4e.

Though in the illustrated embodiment the single spring is disposed between the bearing 3b and the pinion 4e, two separate springs may be used between bearing 3b' and pinion 4e and between pinion 4f and bearing 3b.

In operation, as the shaft 4a is pushed at the knob into the assembly, the lock pinion 4f is disengaged from the latch 3d. In the meantime, the pinion 4e is kept engaged with the rack 2c for the previously mentioned reason. By then turning the knob 4b in any desired direction with the push force kept exerted on the shaft 4a, the slide rail is moved along the guide rail to a desired adjusting position. As soon as the shaft 4a is free from the push force and the turning effort, the shaft is sprung back and the lock pinion 4f resumes the engagement with the latch 3d. Slide movement of the upper rail will no longer take place.

The last mentioned embodiment is particularly advantageous in finer and smoother adjusting movement of the slide rail.

In both of the embodiments, a pull force, instead of push force, may be used to release the adjusting operation, if desired, by slight modifications in the arrangement of springs and other elements.

What is claimed is:

1. An adjustable headrest for a vehicular seat arrangement comprising:
   a stationary guide rail supported on the vehicular seat, said guide rail having a plurality of first notches;
   a slide rail slidably movable along said guide rail forwardly and backwardly of the seat, said slide rail having at least one second notch, a part of said second notch of the slide rail being adapted to align with one of said plurality of first notches of the guide rail;
   a manually operable shaft axially reciprocally supported on said slide rail over the aligned notches, said shaft having biasing means for resiliently holding said shaft in its inoperative position and at least one latch element arranged to engage in the aligned notches of said slide rail and of said guide rail when said shaft is in said inoperative position; and
   a rigid cover enclosing said guide rail, said slide rail and said shaft assembled together and fastened to said slide rail for the back and forth movement therewith.

2. An adjustable headrest according to claim 1, further comprising a cushioning pad provided on said cover and an upholstery formed on said cushioning pad.

3. An adjustable headrest according to claim 1, further comprising means adjusting said guide rail among a plurality of vertical positions with respect to the seat.

4. An adjustable headrest for a vehicular seat arrangement comprising:
   a stationary guide rail supported on the vehicular seat, said guide rail having a rack fixedly laid thereon;
   a slide rail slidably movable along said guide rail forwardly and backwardly of the seat;
   a manually operable shaft rotatably and axially reciprocally supported on said slide rail, said shaft having biasing means resiliently holding said shaft in its inoperative position, a toothed wheel extending through an opening of the slide rail to mesh with said rack, and a lock pinion, said slide rail having a latch element to engage with said lock pinion when said shaft is in its inoperative position; and
   a rigid cover enclosing said guide rail, slide rail and said shaft assembled together and fastened to the slide rail for the back and forth movement therewith.

5. An adjustable headrest according to claim 4, in which said rack is sized to keep mesh of the toothed wheel with the rack at the maximum stroke of the reciprocal movement of the shaft.

* * * * *